(12) United States Patent
Dai et al.

(10) Patent No.: US 12,444,762 B1
(45) Date of Patent: Oct. 14, 2025

(54) METHOD FOR CONTROLLING TEMPERATURE OF THERMAL MANAGEMENT SYSTEM OF FUEL CELL, DEVICE, MEDIUM AND PRODUCT

(71) Applicant: Tongji University, Shanghai (CN)

(72) Inventors: Haifeng Dai, Shanghai (CN); Zhaoming Liu, Shanghai (CN); Hao Yuan, Shanghai (CN); Xuezhe Wei, Shanghai (CN); Jiaping Xie, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 19/027,229

(22) Filed: Jan. 17, 2025

(30) Foreign Application Priority Data

Jun. 25, 2024 (CN) .......................... 202410822160.8

(51) Int. Cl.
*H01M 8/04992* (2016.01)
*H01M 8/0432* (2016.01)
*H01M 8/04007* (2016.01)
*H01M 8/04298* (2016.01)

(52) U.S. Cl.
CPC ... *H01M 8/04992* (2013.01); *H01M 8/04358* (2013.01); *H01M 8/04074* (2013.01); *H01M 8/04305* (2013.01)

(58) Field of Classification Search
CPC ......... H01M 8/04992; H01M 8/04358; H01M 8/04074; H01M 8/04305
See application file for complete search history.

(56) References Cited

U.S. PATENT DOCUMENTS 11,569,517 B2 * 1/2023 Song .................. H01M 8/04313
11,616,243 B2 * 3/2023 Zhu .................... H01M 8/04723
429/439

OTHER PUBLICATIONS

Ahn, J. & Choe, S. "Coolant controls of a PEM fuel cell system" J. Power Sources, vol. 179, pp. 252-264 (2008) (Year: 2008).*
Rojas, J.D., et al. "Thermal Modelling Approach and Model Predictive Control of a Water-cooled PEM Fuel Cell System" 39th Annual Conf. IEEE Industrial Electronics Society, pp. 3806-3811 (2013) available from <https://ieeexplore.ieee.org/abstract/document/6699742> (Year: 2013).*
Saygili, Y., et al. "Model based temperature controller development for water cooled PEM fuel cell systems" Int'l J. Hydrogen Energy, vol. 40, pp. 615-622 (2015) (Year: 2015).*

(Continued)

*Primary Examiner* — Jay Hann
(74) *Attorney, Agent, or Firm* — WCF IP

(57) ABSTRACT

Predicting temperature of a fuel cell, with an actual opening degree of a thermostat in a thermal management system of a fuel cell and inlet coolant temperature at an inlet of a cell stack of the fuel cell as an input, by using a temperature prediction model, correcting the predicted temperature based on a current operating condition to obtain a corrected temperature of the fuel cell; calculating a prediction weight factor based on the current operating condition; and determining an adjustment opening degree of the thermostat, with a target temperature, the actual temperature, the corrected temperature and the prediction weight factor of the fuel cell as an input, by using a PID controller.

12 Claims, 4 Drawing Sheets

(56) References Cited

OTHER PUBLICATIONS

Li, J., et al. "Temperature Control of Proton Exchange Membrane Fuel Cell Based on Machine Learning" Frontiers in Energy Research, vol. 9, article 763099 (2021) (Year: 2021).*

Wang, Q., et al. "Study on the thermal transient of cathode catalyst layer in proton exchange membrane fuel cell under dynamic loading with a two-dimensional model" Chemical Engineering J., vol. 433, 133667 (2022) (Year: 2022).*

Yang, L., et al. "A review on thermal management in proton exchange membrane fuel cells: Temperature distribution and control" Renewable & Sustainable Energy Reviews, vol. 187, 113737 (2023) (Year: 2023).*

* cited by examiner

METHOD FOR CONTROLLING TEMPERATURE OF THERMAL MANAGEMENT SYSTEM OF FUEL CELL, DEVICE, MEDIUM AND PRODUCT

CROSS-REFERENCE TO RELATED PRESENT DISCLOSURE

This patent application claims the benefit and priority of Chinese Patent Application No. 2024108221608 filed with the China National Intellectual Property Administration on Jun. 25, 2024, the disclosure of which is incorporated by reference herein in its entirety as part of the application.

TECHNICAL FIELD

The present disclosure relates to the technical field of fuel cell temperature control, and in particular to a method for controlling temperature of a thermal management system of a high-power fuel cell, a device, a medium and a product.

BACKGROUND

In the hydrogen energy industry chain, a Proton Exchange Membrane Fuel Cell (PEMFC) plays a vital role. Due to the clean and efficient operation characteristics, the PEMFC has seen rapid industrial commercialization in the fields of transportation and fixed power generation in recent years. Unlike power cells that store energy, fuel cells are considered as electrochemical power generation devices. The output power of the fuel cell is not only dependent on external reactants, but also sensitive to temperature changes. It is very important to adjust the real-time temperature accurately and quickly under various operating conditions to improve the efficiency and the service life of the fuel cell. However, due to the non-linear and delay characteristics of a thermal management system of a fuel cell, especially for a thermal management system of a high-power fuel cell, there is often a big contradiction between control accuracy and system response. Therefore, it is still a challenge to achieve accurate and fast temperature control. In the expanding application scenario, improving the intelligence and the adaptability of the control strategy is an important way to improve the accuracy and the responsiveness of thermal management of the fuel cell, which is of great significance to further improve the performance and the reliability of the fuel cell.

Aiming at the thermal management of a high-power fuel cell system, the traditional Proportional Integral Differential (PID) control method in the industry still has limitations in improving performance. The traditional PID control uses the difference between a real-time feedback value and a target value as an input to calculate the control amount, and relies heavily on the accuracy of the real-time information feedback of the thermal management system of the fuel cell. However, the thermal management system of the high-power fuel cell has a long and complicated pipeline structure, and the coolant has a high viscosity, so that there is an obvious lag between a feedback output of a system and the operation of an actuator in the closed-loop control. Therefore, when the traditional PID control is used in the thermal management system of the fuel cell, there will be a large error between the current real-time feedback value and the true real-time feedback value. Such error will result in significant overshoot and fluctuation, and it is also difficult to guarantee the dynamic response speed of the system. Therefore, there is an urgent need for a control method that can compensate for the problem of fuel cell temperature control to improve the accuracy of temperature control.

SUMMARY

The present disclosure aims to provide a method for controlling temperature of a thermal management system of a fuel cell, a device, a medium and a product. By predicting the temperature, correcting the temperature and calculating the weight factor, the method can compensate for the problem of an obvious lag between a feedback output of a system and the operation of an actuator, and adjust the temperature accurately and quickly.

In order to achieve the above objective, the present disclosure provides the following solutions. A method for controlling temperature of a thermal management system of a fuel cell is provided, including:

acquiring actual temperature of the fuel cell at the current control time, an actual opening degree of a thermostat in the thermal management system of the fuel cell and an inlet coolant temperature at an inlet of a cell stack of the fuel cell;

predicting temperature of the fuel cell at the current control time, with the actual opening degree and the inlet coolant temperature as an input, by using a temperature prediction model;

correcting the predicted temperature based on a current operating condition to obtain a corrected temperature of the fuel cell at the current control time;

calculating a prediction weight factor at the current control time based on the current operating condition; and determining an adjustment opening degree of the thermostat at the current control time, with a target temperature, the actual temperature, the corrected temperature and the prediction weight factor of the fuel cell as an input, by using a Proportional Integral Differential (PID) controller.

A computer device is provided, including a memory, a processor and a computer program stored in the memory and operable on the processor, wherein the processor executes the computer program to implement the steps of the method for controlling temperature of the thermal management system of the fuel cell described above.

A computer-readable storage medium is provided, on which a computer program is stored, wherein the computer program, when executed by a processor, implements the steps of the method for controlling temperature of the thermal management system of the fuel cell described above.

A computer program product is provided, including a computer program, wherein the computer program, when executed by a processor, implements the steps of the method for controlling temperature of the thermal management system of the fuel cell described above.

According to the embodiments provided by the present disclosure, the present disclosure discloses the following technical effects.

The present disclosure provides a method for controlling temperature of a thermal management system of a fuel cell, a device, a medium and a product. The method includes the following steps: acquiring actual temperature of the fuel cell at the current control time, an actual opening degree of a thermostat in the thermal management system of the fuel cell and an inlet coolant temperature at an inlet of a cell stack of the fuel cell; predicting temperature of the fuel cell at the current control time, with the actual opening degree and the inlet coolant temperature as an input, by using a temperature prediction model; correcting the predicted temperature based on a current operating condition to obtain a corrected temperature of the fuel cell at the current control time; calculating a prediction weight factor at the current control time based on the current operating condition; and determining an adjustment opening degree of the thermostat at the current control time, with a target temperature, the actual temperature, the corrected temperature and the prediction weight factor of the fuel cell as an input, by using the PID controller. By predicting the temperature, correcting the temperature and calculating the weight factor, the method can compensate for the problem of an obvious lag between a feedback output of a system and the operation of an actuator, and adjust the temperature accurately and quickly.

BRIEF DESCRIPTION OF THE DRAWINGS

In order to explain the embodiments of the present disclosure or the technical solutions in the prior art more clearly, the drawings that need to be used in the embodiments will be briefly introduced. Obviously, the drawings in the following description are only some embodiments of the present disclosure. For those skilled in the art, other drawings can be obtained according to these drawings without creative labor.

DETAILED DESCRIPTION OF THE EMBODIMENTS

Figure 1:
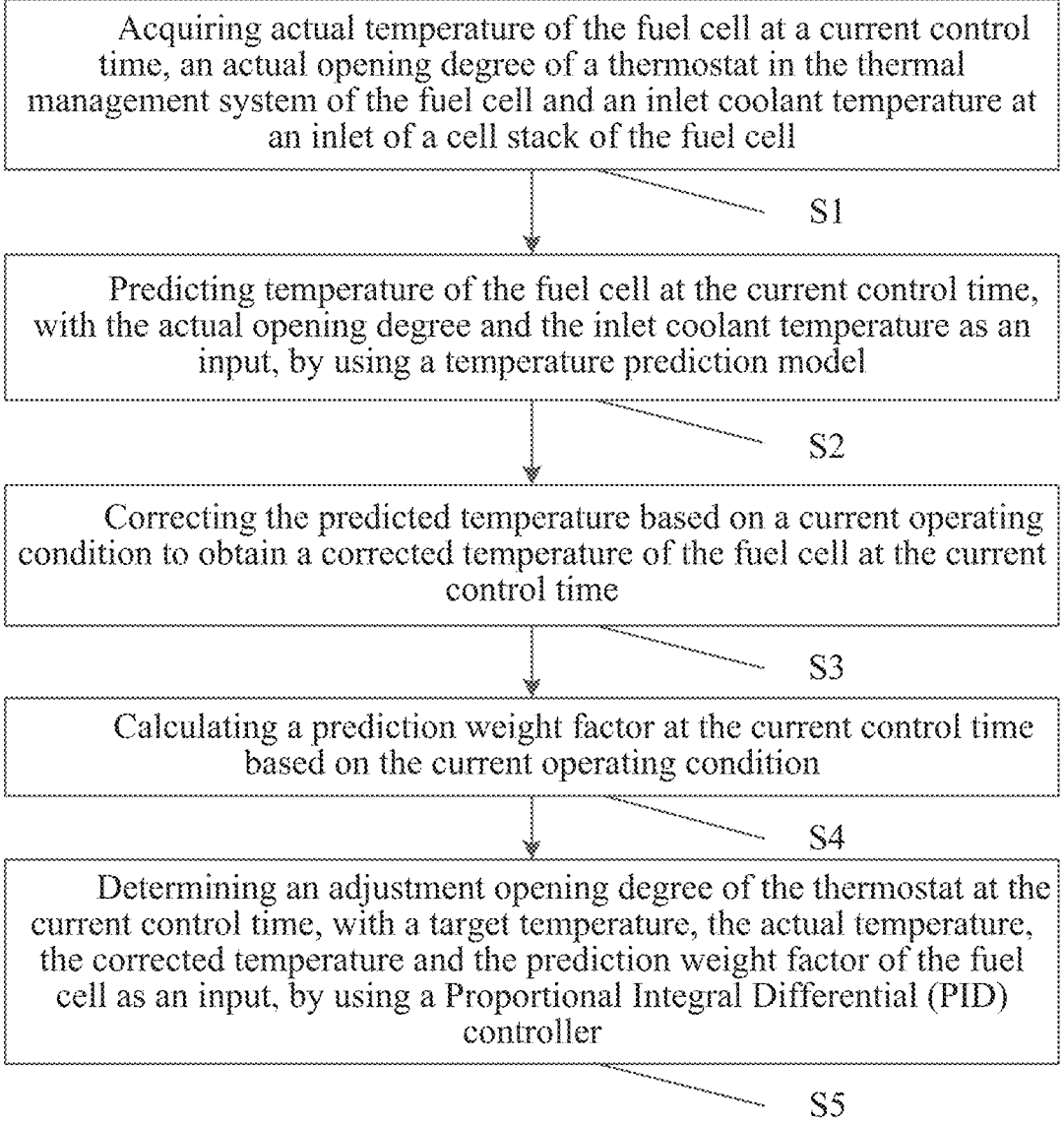
FIG. 1 is a schematic diagram of a method flow of a method for controlling temperature of a thermal management system of a fuel cell according to Embodiment 1 of the present disclosure.
Figure 2:
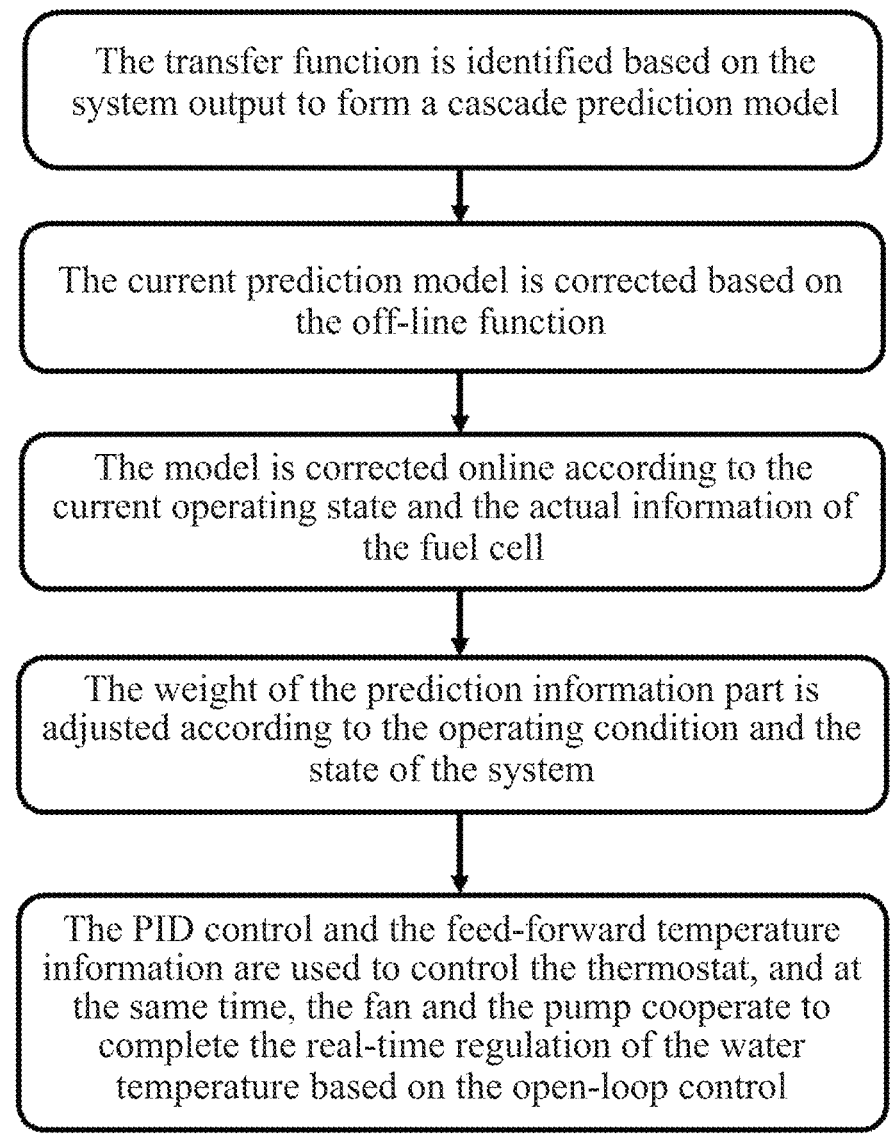
FIG. 2 is a schematic diagram of a detailed flow of a method for controlling temperature of a thermal management system of a fuel cell according to Embodiment 1 of the present disclosure.

The technical solutions in the embodiments of the present disclosure will be clearly and completely described with reference to the drawings in the embodiments of the present disclosure hereinafter. Obviously, the described embodiments are only some embodiments of the present disclosure, rather than all of the embodiments. Based on the embodiment of the present disclosure, all other embodiments obtained by those skilled in the art without creative labor fall within the scope of protection of the present disclosure.

The present disclosure aims to provide a method for controlling temperature of a thermal management system of a fuel cell, a device, a medium and a product. By predicting the temperature, correcting the temperature and calculating the weight factor, the method can compensate for the problem of an obvious lag between a feedback output of a system and the operation of an actuator, and adjust the temperature accurately and quickly.

In order to make the above objectives, features and advantages of the present disclosure more obvious and understandable, the present disclosure will be explained in further detail with reference to the drawings and detailed description hereinafter.

Embodiment 1

As shown in FIG. 1, FIG. 2 and FIGS. 3A-B, a method for controlling temperature of a thermal management system of a fuel cell in this embodiment includes the following steps.

In step S1, actual temperature of a fuel cell at the current control time, an actual opening degree of a thermostat in a thermal management system of a fuel cell and an inlet coolant temperature at an inlet of a cell stack of the fuel cell are acquired.

In step S2, temperature of the fuel cell at the current control time is predicted with the actual opening degree and the inlet coolant temperature as an input, by using a temperature prediction model.

In step S3, the predicted temperature is corrected based on a current operating condition to obtain a corrected temperature of the fuel cell at the current control time.

In step S4, a prediction weight factor at the current control time is calculated based on the current operating condition.

In step S5, an adjustment opening degree of the thermostat at the current control time is determined with a target temperature, the actual temperature, the corrected temperature and the prediction weight factor of the fuel cell as an input, by using a PID controller.

Because it is difficult to monitor the actual temperature of the fuel cell, considering that the outlet coolant temperature at the outlet of the cell stack of the fuel cell is close to the actual temperature of the fuel cell and can be monitored, in this embodiment, the outlet coolant temperature is selected as the actual temperature of the fuel cell.

In this embodiment, after calculating the adjustment opening degree of the thermostat (also referred to as an electronic temperature controller and an electronic thermostat) in the thermal management system of the fuel cell at each control time, the opening degree of the thermostat is adjusted to the adjustment opening degree, so that the actual opening degree of the thermostat at the current control time is equal to the adjustment opening degree of the thermostat at the previous control time.

Figure 3A:
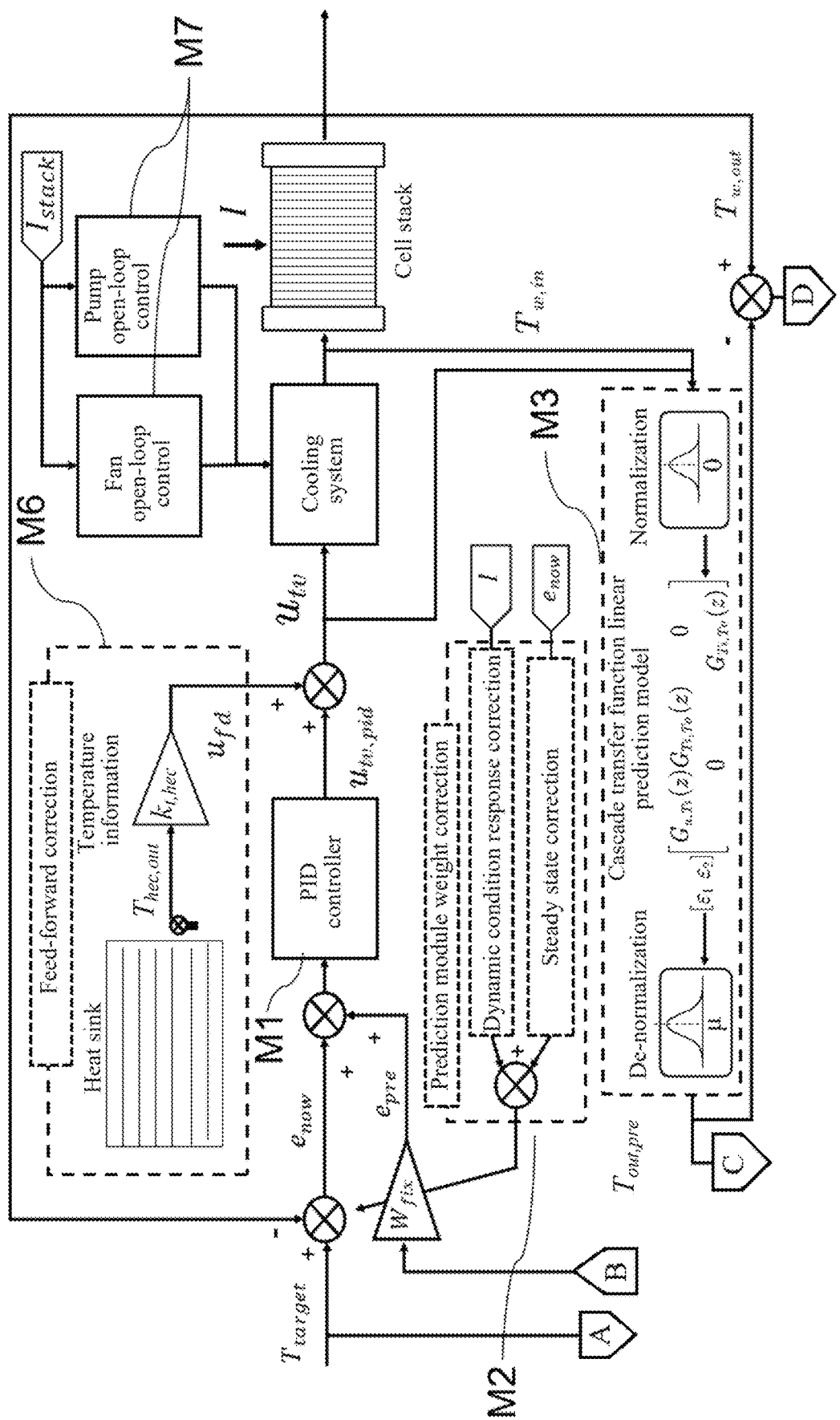
FIG. 3A and FIG. 3B together form a schematic diagram of a control architecture of a method for controlling temperature of a thermal management system of a fuel cell according to Embodiment 1 of the present disclosure.
Figure 3B:
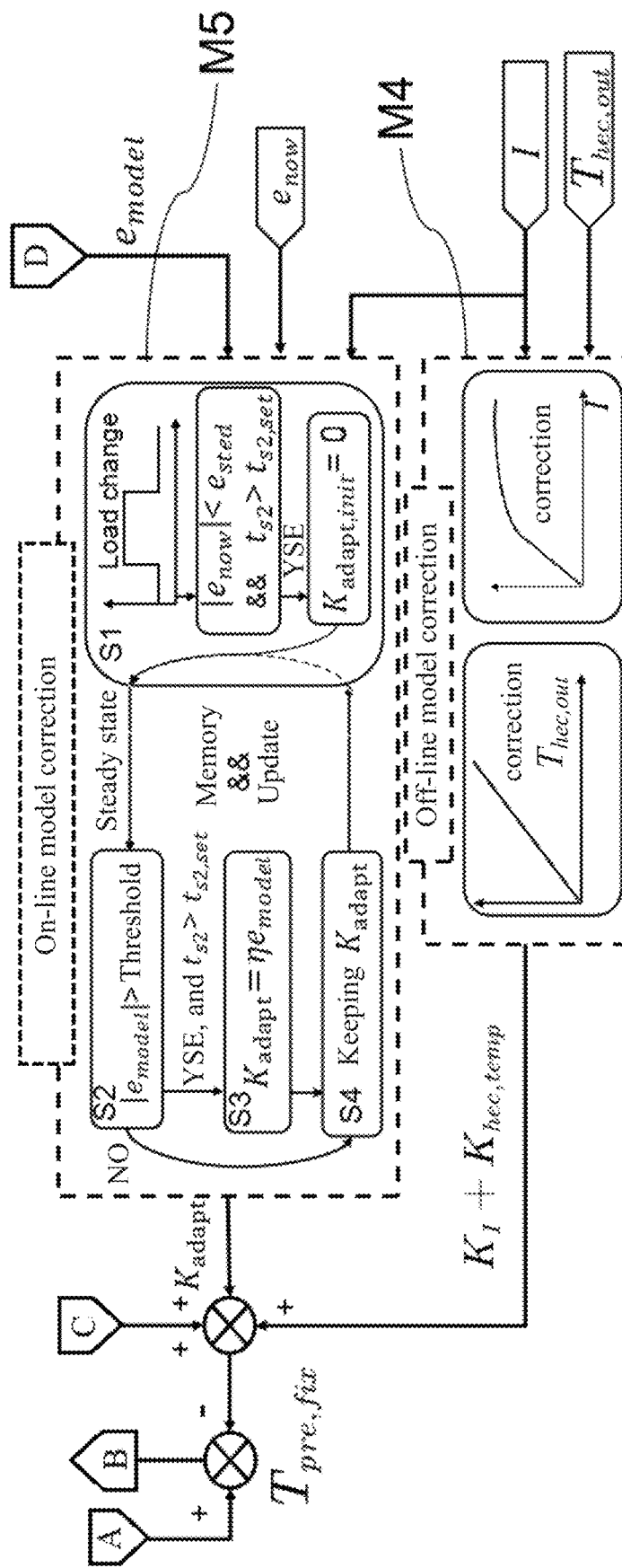

In view of the limitations of the PID control method, in this embodiment, the lag problem may be solved by reasonable prediction, and the fuel cell will have a certain degree of time-variant characteristics during operation. Therefore, for the model-based prediction control architecture, attention also needs to be paid to the real-time matching degree of the model to improve the accuracy of the model. Based on the above control problems, in this embodiment, a temperature model adaptive prediction control architecture, that is, a new prediction control architecture based on a transfer function model and a real-time feedback, is proposed. As shown in FIGS. 3A-B, a prediction weight correction module, a cascade transfer function linear prediction model module, an off-line and on-line model correction modules and a heat sink outlet water temperature feedforward correction module are added in the traditional feedback PID control thermostat architecture, wherein the functions of each module are as follows.

M1 is the PID controller module, which calculates the control amount (that is, the adjustment opening degree) of the thermostat in the thermal management system in real time based on the proportion, the integral and the differential according to the error between the system output (that is, the actual temperature and the corrected temperature) and the target value (that is, the target temperature), taking into account the prediction weight factor of the corrected temperature.

M2 is the prediction weight correction module, which adjusts the weight of the prediction information part in the closed-loop logic of the fuel cell in real time according to the current operating condition to obtain the prediction weight factor, so as to achieve the adjustment of the proportion of the prediction information and the actual information and improve the control effect under different operating conditions.

M3 is the cascade transfer function linear prediction model module, which can identify the temperature prediction model of the fuel cell based on the input and output test data of the fuel cell system, and is used to predict the system output (that is, predicted temperature) according to the control input (that is, the actual opening degree and the inlet coolant temperature), thus compensating for the system lag.

M4 is the off-line model correction module. Because the fuel cell has strong non-linear characteristics, the temperature prediction model identified at a certain operating point needs to be corrected according to the change of operating conditions to adapt to the current operating conditions. According to the off-line experimental results, an off-line correction function can be designed, in which the input is the current state of the system (that is, load current and outlet water temperature) and the output is the off-line correction amount.

M5 is the on-line model adaptive correction module. Because the fuel cell is an electrochemical power generation device, and the system output is often influenced by the historical usage and has strong time-variant characteristics, the temperature prediction model further needs to be self-corrected in real time according to the actual information to improve the prediction accuracy in the control process.

M6 is the heat sink outlet water temperature feed-forward correction module. Because water inside the heat sink is large in volume, the water temperature has a great influence on the control effect of the thermostat, and the temperature is random, it is necessary to use the heat sink outlet water temperature feed-forward to achieve the rapid adjustment of the thermostat.

M7 is the pump and fan open-loop control module. The above closed-loop control logic is mainly aimed at the thermostat. In order to avoid control instability resulted from multi-parameter closed-loop coupling, the pump and fan are designed as open-loop control according to the load current in this control strategy.

In this embodiment, the feedback controller (the PID controller) is combined with the on-line predictor (that is, the temperature prediction model), to solve the contradiction between the control response and the accuracy in the fuel cell temperature regulation. The cascade transfer function model without delay is selected and identified to predict the output temperature of the system with delay compensation. An on-line model self-updating algorithm is designed to improve the model matching in real time and deal with the time-variant characteristics of the fuel cell system, which enables the model to be more reliable in the dynamic prediction process, makes up for the shortcomings of the traditional temperature control, and further improves the intelligence, the accuracy and the rapidity of the fuel cell temperature control.

Prior to step S2, the method for controlling temperature of this embodiment further includes: establishing a temperature prediction model (that is, M3 in FIGS. 3A-B). In this step, the fuel cell input-output prediction model is identified based on the test data of the fuel cell system with the opening degree of the thermostat in the thermal management system of the fuel cell and the inlet coolant temperature of the cell stack of the fuel cell as an input and with the temperature (that is, the outlet coolant temperature) of the fuel cell as an output, and specifically the transfer function is identified based on the system output to form a cascade prediction model. This step includes following contents.

(1) An actual sample data set is acquired; wherein the actual sample data set includes a plurality of groups of actual sample data, and the actual sample data includes sample values of the actual opening degree, sample values of the inlet coolant temperature and sample values of the actual temperature.

Excitation signals of the actuator are added to the cooling system of the fuel cell. The opening degree of the thermostat in the thermal management system of the fuel cell and the response of the temperature sensors at the inlet and the outlet of the cell stack of the fuel cell for detecting the coolant temperature are monitored to obtain the sample data of the opening degree, the inlet coolant temperature and the outlet coolant temperature, that is, the sample values of the actual opening degree, the sample values of the inlet coolant temperature and the sample values of the actual temperature are obtained to form the actual sample data set.

(2) Data normalization processing is carried out on the actual sample data set to obtain a normalized data set.

In order to better capture the dynamic characteristics of the fuel cell system, the sample data (that is, the actual sample data set) used to identifying the model is normalized to:

$$\begin{cases} u'_{tv}(k) = (u_{tv}(k) - H_u)/W_u \\ T'_{w,in}(k) = (T_{w,in}(k) - H_{w,in})/W_{w,in} \\ T'_{w,out}(k) = (T_{w,out}(k) - H_{w,out})/W_{w,out} \end{cases} \quad (1)$$

In formula (1), $u'_{tv}(k)$ is the actual opening degree normalized of the k-th sampling point, and the k-th sampling point corresponds to the k-th group of actual sample data, where $k=1, 2, \ldots, N$, N is the total number of sampling points, that is, the total number of groups of actual sample data included in the actual sample data set; $u_{tv}(k)$ is the sample value of the actual opening degree of the k-th sampling point; $H_u$ is a mean value of the sample values of the actual opening degree; $W_u$ is a standard deviation of the sample values of the actual opening degree; $T'_{w,in}(k)$ is the inlet coolant temperature normalized of the k-th sampling point; $T_{w,in}(k)$ is the sample value of the inlet coolant temperature of the k-th sampling point; $H_{w,in}$ is a mean value of the sample values of the inlet coolant temperature; $W_{w,in}$ is a standard deviation of the sample values of the inlet coolant temperature; $T'_{w,out}(k)$ is the actual temperature normalized of the k-th sampling point; $T_{w,out}(k)$ is the sample value of the actual temperature of the k-th sampling point; $H_{w,out}$ is a mean value of the sample values of the actual temperature; and $W_{w,out}$ is a standard deviation of the sample values of the actual temperature.

(3) Taking the actual opening degree and the inlet coolant temperature as an input and the actual temperature as an output, a transfer function between the input and the output based on the normalized data set is identified to obtain a temperature prediction model.

The discrete transfer functions between the actual opening degree and the inlet coolant temperature and between the inlet coolant temperature and the actual temperature are identified by using the transfer function identification method based on the least square method, and the obtained discrete transfer function model is as follows:

$$\begin{cases} G_{u,Ti}(z) = f_{iden}\left(u'_{tv}(k), T'_{w,in}\left(k + \frac{T_1}{T}\right)\right) \\ G_{Ti,To}(z) = f_{iden}\left(T'_{w,in}(k), T'_{w,out}\left(k + \frac{T_2}{T}\right)\right) \end{cases} \quad (2)$$

In formula (2), $G_{u,Ti}(z)$ is a discrete transfer function with the actual opening degree as the input and the inlet coolant temperature as the output, z is the Z transformation of a discrete system; $f_{iden}$ represents the transfer function identification process based on the least square method; $u'_{tv}(k)$ is the actual opening degree normalized of the k-th sampling point;

$$T'_{w,in}\left(k + \frac{T_1}{T}\right)$$

is the inlet coolant temperature normalized of the $$\left(k + \frac{T_1}{T}\right) - th$$

sampling point; $\tau_1$ is the fluid temperature transfer delay time of fluid from the thermostat to the inlet of the cell stack; T is the sampling time interval of the control system, that is, the time interval between two adjacent control times; $G_{Ti,To}(z)$ is a discrete transfer function with the inlet coolant temperature as the input and the actual temperature as the output; $T'_{w,in}(k)$ is the inlet coolant temperature normalized at the k-th sampling point;

$$T'_{w,out}\left(k + \frac{T_2}{T}\right)$$

is the actual temperature normalized of the $$\left(k + \frac{T_2}{T}\right) - th$$

sampling point; and $\tau_2$ is the fluid temperature transfer delay time of fluid from the inlet of the cell stack to the outlet of the cell stack. In this embodiment, the time-lag effect is taken into account in the model identification. The delay time (that is, $\tau_1$ and $\tau_2$) is compensated in the transfer function identification, so that the prediction without delay can be achieved.

The identified discrete transfer function model achieves real-time temperature prediction in a cascade form. The temperature prediction model is as follows:

$$T_{out,pre} = [\varepsilon_1 \quad \varepsilon_2] \begin{bmatrix} G_{u,Ti}(z)G_{Ti,To}(z) & 0 \\ 0 & G_{Ti,To}(z) \end{bmatrix} \quad (3)$$

$$\begin{bmatrix} \frac{(u_{tv} - H_u)W_{w,out}}{W_u} \\ \frac{(T_{w,in} - H_{w,in})W_{w,out}}{W_{w,in}} \end{bmatrix} + H_{w,out}$$

In formula (3), $T_{out,pre}$ is the predicted temperature; $\varepsilon_1$ is a first weight factor; $\varepsilon_2$ is a second weight factor; $\varepsilon_1$ and $\varepsilon_2$ are both weight factors of the cascade model, $\varepsilon_1 > 0$, $\varepsilon_2 > 0$, and $\varepsilon_1 + \varepsilon_2 = 1$; $G_{u,Ti}(z)$ is a discrete transfer function with the actual opening degree as the input and the inlet coolant temperature as the output, $G_{u,Ti}(z)$ includes the temperature transfer delay time between the actual opening degree and the inlet coolant temperature, and z is the Z transformation of a discrete system; $G_{Ti,To}(z)$ is a discrete transfer function with the inlet coolant temperature as the input and the actual temperature as the output, and $G_{Ti,To}(z)$ includes the temperature transfer delay time between the inlet coolant temperature and the actual temperature; $u_{tv}$ is the actual opening degree; $H_u$ is a mean value of sample values of the actual opening degree; $W_{w,out}$ is a standard deviation of sample values of the actual temperature; $W_u$ is a standard deviation of sample values of the actual opening degree; $T_{w,in}$ is the inlet coolant temperature; $H_{w,in}$ is a mean value of sampled values of the inlet coolant temperature; $W_{w,in}$ is a standard deviation of the sample values of the inlet coolant temperature; and $H_{w,out}$ is a mean value of the sample values of the actual temperature.

In step S2, the actual opening degree and the inlet coolant temperature are directly taken as an input, and the temperature prediction model shown in formula (3) is used to predict and obtain the predicted temperature of the fuel cell at the current control time.

In step S3, the predicted temperature is corrected based on a current operating condition to obtain corrected temperature of the fuel cell at the current control time, which specifically includes the following content.

(1) Load current of the fuel cell at the current control time and outlet water temperature at an outlet of a heat sink in the thermal management system of the fuel cell are acquired; and an off-line correction amount for off-line correction of the predicted temperature is determined based on the load current and the outlet water temperature.

(2) A difference between the target temperature and the actual temperature of the fuel cell is calculated to obtain an actual error; the difference between the actual temperature and the predicted temperature is calculated to obtain a prediction error; and an on-line correction amount for on-line correction of the predicted temperature is determined based on the load current, the actual error and the prediction error.

(3) A sum of the predicted temperature, the off-line correction amount and the on-line correction amount is calculated to obtain the corrected temperature of the fuel cell at the current control time. A calculation formula of the corrected temperature is:

$$T_{pre,fix} = T_{out,pre} + K_{adapt} + K_I + K_{hec,temp} \quad (4)$$

In formula (4), $T_{pre,fix}$ is the corrected temperature, which indicates the corrected temperature prediction value; $T_{out,pre}$ is the predicted temperature; $K_{adapt}$ is the on-line correction amount; $K_I$ is a load current correction amount; $K_{hec,temp}$ is an outlet water temperature correction amount; and a sum of the load current correction amount and the outlet water temperature correction amount is the off-line correction amount.

In this embodiment, the process of correcting the temperature prediction model based on the off-line correction function is referred to as the off-line correction (that is, M4 in FIGS. 3A-B). Based on the current load current and the outlet water temperature of the heat sink, the off-line correction function is designed for correction. The calculation formula (that is, the off-line correction function) of the off-line correction amount is:

$$\begin{cases} K_I = k_1 I + b_1 \\ K_{hec,temp} = k_2 T_{hec,temp} + b_2 \end{cases} \quad (5)$$

In formula (5), $K_I$ is a load current correction amount, which indicates the correction parameter under different load conditions; $k_1$ is a first linear parameter; I is a load current; $b_1$ is a second linear parameter; $K_{hec,temp}$ is the outlet water temperature correction amount, which indicates the correction parameter of the cooling water temperature state in the heat sink section; $k_2$ is a third linear parameter; $T_{hec,temp}$ is the outlet water temperature; $b_2$ is a fourth linear parameter; $k_1$, $b_1$, $k_2$ and $b_2$ are linear parameters, which can be determined by experimental calibration of fuel cells with different powers.

The off-line correction amount is a sum of the load current correction amount and the outlet water temperature correction amount.

In this embodiment, the temperature prediction model is corrected online according to the current operating state and the actual information of the fuel cell (that is, M5 in FIGS. 3A-B). In the on-line correction process, model mismatch usually occurs due to the change in the operating point and the time-variant characteristics of the fuel cell system. Therefore, on-line model adaptation should be taken into account in real-time control. In this embodiment, an adaptive state flow algorithm with iteration and memories is designed, which can correct online the temperature prediction model. The specific process of the algorithm is as follows.

In step 1, the current load current state is identified.

If $(I(k)-I(k-1)) \neq 0$, the state transfers to State 1; $I(k)$ is the load current at k control time; and $I(k-1)$ is the load current at $(k-1)$ control time.

In step 2, the on-line correction amount is iterated.

State 1:
1) When proceeding into State 1, the on-line correction amount at k control time is adapt $(k)=0$; and a first counting time is $t_{s1}=0$.
2) When staying in State 1, $t_{s1}(k+1)=t_{s1}(k)+1$, where $t_{s1}(k+1)$ is the first counting time at $(k+1)$ control time; and $t_{s1}(k)$ is the first counting time at k control time.
3) When exiting from State 1, $t_{s1}=0$.
4) Exiting determination: if State 1 satisfies $\{t_{s1}>\tau_{s1}\}$ & $\{|e_{now}|<E_1\}$, transfer to State 2 (a); otherwise stay in State 1, where $\tau_{s1}$ is a first time threshold; $e_{now}$ is an actual error; and $E_1$ is a first error threshold.

State 2(a):
1) When proceeding into State 2 (a), $K_{adapt}(k)=K_{adapt}(k)$
2) Exiting determination: if State 2(a) satisfies $|T_{w,out}-T_{out,pre}|>E_2$, transfer to State 2 (b); otherwise stay in State 2 (a); where $T_{w,out}$ is the actual temperature; $T_{out,pre}$ is the predicted temperature; and $E_2$ is a second error threshold.

State 2(b):
1) When proceeding into State 2 (b), $K_{adapt}(k)=K_{adapt}(k)$, and a second counting time is $t_{s2}=0$.
2) When staying in State 2 (b), $t_{32}(k+1)=t_{s2}(k)+1$, $t_{s2}(k+1)$ is a second counting time at $(k+1)$ control time; and $t_{s2}(k)$ is a second counting time at k control time.
3) When exiting from State 2(b), $t_{s2}=0$.
4) Exiting determination, if State 2(b) satisfies $|T_{w,out}-T_{out,pre}| \leq E_2$, transfer to State 2 (a); and if $\{t_{s2}>\tau_{s2}\}$, transfer to State 3; otherwise stay in State 2 (b); where $\tau_{s2}$ is a second time threshold.

State 3:
1) When proceeding into State 3, $K_{adapt}(k)=K_{adapt}(k)$; the third counting time is $t_{s3}=0$; and $E_{model}=T_{w,out}-T_{out,pre}$; where $E_{model}$ is the prediction error.
2) When staying in State 3, $t_{s3}(k+1)=t_{s3}(k)+1$, and $K_{adapt}(k+1)=\eta \cdot E_{model}$; where $t_{s3}(k+1)$ is the third counting time at $(k+1)$ control time; $t_{s3}(k)$ is the third counting time at k control time; and n is a buffer factor, which is a value between 0 and 1.
3) When exiting from State 3, $t_{s3}=0$, and $K_{adapt}(k+1)=K_{adapt}(k+1)$.
4) If the State 3 satisfies $\{t_{s3}>\tau_{s3}\}$, transfer back to State 2 (a); otherwise stay in State 3; where $\tau_{s3}$ is a second time threshold.

In any state in step 2, if $(I(k)-I(k-1)) \neq 0$ is satisfied, transfer to State 1.

In the above state flow algorithm, $t_{s1}$, $t_{s2}$ and $t_{s3}$ are the counting time of proceeding into each state, respectively; $\tau_{s1}$, $\tau_{s2}$ and $\tau_{s3}$ are the time thresholds of state transfer, and $E_1$ and $E_2$ are the error thresholds of state transfer, which can be calibrated according to different systems. An on-line correction amount for on-line correction of the predicted temperature is determined based on the load current, the actual error and the prediction error, which includes the following content:

(1) determining whether a difference between the load current and a load current at the previous control time is equal to 0;
(2) if not, proceeding into a first state, assuming the first counting time as 0, and determining whether the first counting time is greater than a first time threshold and whether an absolute value of the actual error is less than a first error threshold to obtain a first determination result; if the first determination result is NOT, the state of the current control time acting as a first state, increasing the first counting time by 1, and assuming the on-line correction amount as a first predetermined value; if the first determination result is YES, setting the first counting time to 0, proceeding into a second state, and determining whether an absolute value of the prediction error is greater than a second error threshold to obtain a second determination result; if the second determination result is NOT, the state of the current control time acting as a second state, and assuming the on-line correction amount as a second predetermined value; if the second determination result is YES, proceeding into a third state, assuming the second counting time as 0, and determining whether the absolute value of the prediction error is less than or equal to a second error threshold to obtain a third determination result; if the third determination result is YES, setting the second counting time to 0, proceeding into the second state, and returning to the step of "determining whether an absolute value of the prediction error is greater than a second error threshold"; if the third determination result is NOT, determining whether the second counting time is greater than a second time threshold to obtain a fourth determination result; if the fourth determination result is NOT, the state of the current control time acting as a third state, increasing the second counting time by 1, and assuming the on-line correction amount as a third predetermined value; if the fourth determination result is YES, setting the second counting time to 0, proceeding to a fourth state, assuming the third counting time as 0, and determining whether the third counting time is greater than a third time threshold to obtain a fifth determination result; if the fifth determination result is YES, setting the third counting time to 0, proceeding to the second state, and returning to the step of "determining whether an absolute value of the prediction error is greater than a second error threshold"; if the fifth determination result is NOT, the state of the current control time acting as a fourth state, increasing the third counting time by 1, and assuming the on-line correction amount as a fourth predetermined value; and (3) if so, acquiring the state of the previous control time; if the state is the first state, returning to the step of "determining whether the first counting time is greater than a first time threshold"; if the state is the second state, returning to the step of "determining whether an absolute value of the prediction error is greater than a second error threshold"; if the state is the third state, returning to the step of "determining whether the absolute value of the prediction error is less than or equal to a second error threshold"; if the state is the fourth state, returning to the step of "determining whether the third counting time is greater than a third time threshold".

It should be noted that if the current control time proceeds to the first state, the first predetermined value is 0, the second predetermined value is 0, the third predetermined value is 0, and the fourth predetermined value is a product of a buffer factor and the prediction error; and if the current control time does not proceed to the first state, the first predetermined value is the on-line correction amount of the previous control time, the second predetermined value is the on-line correction amount of the previous control time, the third predetermined value is the on-line correction amount of the previous control time, and the fourth predetermined value is the product of the buffer factor and the prediction error.

In this embodiment, the weight of the prediction information part is adjusted according to the operating condition and the state of the system (that is, M2 in FIGS. 3A-B). In the feedback control, the control error resulted from the delay effect of the load change section will be more serious than that in the steady state. Therefore, the prediction weight needs to be adjusted according to the load of the fuel cell system. Under the dynamic load condition, the prediction weight factor should be larger to achieve the appropriate delay compensation and reduce the control overshoot and fluctuation. On the contrary, in the steady state, the prediction weight factor should be smaller to rely more on the real information to reduce the stability error. A calculation formula of the prediction weight factor is:

$$W_{fix} = W_{d,rp} + \gamma_s |e_{now}| + \gamma_c \quad (6)$$

In formula (6), $W_{fix}$ is a prediction weight factor; $W_{d,rp}$ is a dynamic response factor determined based on fluctuation of the load current, which indicates the dynamic response factor when the load current changes; $\gamma_s$ is a positive constant; $e_{now}$ is an actual error between the target temperature and the actual temperature of the fuel cell; and $\gamma_c$ is a positive constant.

$$W_{d,rp}(k+1) = \begin{cases} W_h, & \left\{C_I(k) \in \left[\dfrac{\mathcal{T}_{w,0}}{T}, \theta_1 \dfrac{\mathcal{T}_{w,0}}{T}\right]\right\} \& \{|e_{now}| < 3\} \\ \dfrac{W_h}{2}, & \left\{C_I(k) \in \left[\theta_1 \dfrac{\mathcal{T}_{w,0}}{T}, \theta_2 \dfrac{\mathcal{T}_{w,0}}{T}\right]\right\} \& \{|e_{now}| < 1\} \\ \dfrac{W_h}{3}, & \left\{C_I(k) \in \left[\theta_2 \dfrac{\mathcal{T}_{w,0}}{T}, 0\right]\right\} \& \{|e_{now}| < 0.5\} \\ 0, & C_I(k) = 0 \end{cases} \quad (7)$$

In formula (7), $W_{d,rp}(k+1)$ is a dynamic response factor at k+1 control time; $W_h$ is a constant, which is a constant set by experimental calibration; $C_I(k)$ is the counting time of current change upon current continuously changing to k control time, that is, the counting time after the current changes; $\tau_{w,0}$ is a constant, which indicates a constant time setting parameter that can be calibrated for different systems; T is a time interval between two adjacent control times; $\theta_1$ is a constant; and $\theta_2$ is a constant, $1 > \theta_1 > \theta_2 > 0$.

$$C_I(k+1) = \begin{cases} \dfrac{\mathcal{T}_{w,0}}{T}, & (I(k) - I(k-1)) \neq 0 \\ C_I(k) - 1, & (I(k) - I(k-1)) = 0 \\ \max(0, C_I(k)) \end{cases} \quad (8)$$

In formula (8), $C_I(k+1)$ is the counting time of current change upon current continuously changing to k+1 control time; $I(k)$ is the load current at k control time; and $I(k-1)$ is the load current at k−1 control time.

In this embodiment, based on the corrected prediction information and the real-time information, in order to achieve the closed-loop control of the temperature, the PID is used as the basic controller for real-time temperature adjustment. The input signal of the PID controller consists of the actual temperature control error and the predicted temperature control error, which is calculated by the established model (that is, M1 in FIGS. 3A-B). Therefore, the calculation formula of the output of the controller, that is, the adjustment opening degree, is:

$$u_{tv,pid} = [K_p \quad K_i \quad K_d] \begin{bmatrix} e_{now} + W_{fix} e_{pre} \\ \int (e_{now} + W_{fix} e_{pre}) \\ e_{now} + W_{fix} e_{pre} \end{bmatrix} \quad (9)$$

In formula (9), $u_{tv,pid}$ is an adjustment opening degree, which indicates the opening degree of the thermostat adjusted by the PID controller; $K_p$ is a proportional parameter of the PID controller; $K_i$ is an integral parameter of the PID controller; $K_d$ is a differential parameter of the PID controller; $e_{now}$ is an actual error between the target temperature and the actual temperature of the fuel cell, which indicates the actual temperature control error; $W_{fix}$ is a prediction weight factor; $e_{pre}$ is a correction error between the target temperature and the corrected temperature of the fuel cell, which indicates the predicted temperature control error.

$$\begin{cases} e_{now} = T_{out,ref} - T_{st,out} \\ e_{pre} = T_{out,ref} - T_{pre,fix} \end{cases} \quad (10)$$

In formula (10), $T_{out,ref}$ is the target temperature of the fuel cell; $T_{st,out}$ is the actual temperature; and $T_{pre,fix}$ is the corrected temperature.

In the actual operation scenario, the temperature of cooling water in the heat exchanger is influenced by the external interference and the historical usage pattern, so that it is challenging to accurately estimate the water temperature of the cooling water. Therefore, it is necessary to install a temperature sensor at the outlet of the heat exchanger to acquire real-time information, and add a feed-forward correction parameter part (that is, M6 in FIGS. 3A-B) in the control architecture to improve the responsiveness of the thermostat according to the temperature data of the heat exchanger. Therefore, in this embodiment the PID control and the feed-forward temperature information are used to control the thermostat. The output of the controller is:

$$u_{tv} = u_{tv,pid} + k_{t,hec} T_{hec,out} \quad (11)$$

In formula (11), $u_{tv}$ is the final adjustment opening degree of the thermostat; $k_{t,hec}$ is a constant compensation factor; $T_{hec,out}$ is the outlet water temperature of the heat sink.

In this embodiment, the fan and the pump cooperate to complete the real-time regulation of the water temperature based on the open-loop control (that is, M7 in FIGS. 3A-B), that is, the fan and the pump design an open-loop control scheme according to the load current and are matched with the adjustment of the thermostat as follows:

$$\begin{cases} u_{fan} = f1(I) \\ u_{pum} = f2(I) \end{cases} \quad (12)$$

In formula (12), $u_{fan}$ is a fan speed; $f1$ is a calibration logic based on current, which is set by experimental calibration according to actual fan parameters; I is the load current; $u_{pum}$ is a pump speed; and $f2$ is a calibration logic based on current, which is set by experimental calibration according to actual pump parameters.

The method of controlling temperature of this embodiment has the following advantages.

(1) By combining the prediction control with the traditional PID control, the fluctuation of temperature control resulted from the large lag of the cooling system of the high-power fuel cell system in the traditional control method can be reduced, and the system response and the control accuracy can be improved.

(2) Aiming at the problem of model mismatch, off-line and on-line model self-correction algorithms are designed, so that the fuel cell prediction model can be adjusted according to the actual situation, which improves the accuracy of the whole control process and reduces the influence of model mismatch resulted from the time-variant characteristics of the system.

Embodiment 2

A computer device is provided, including a memory, a processor and a computer program stored in the memory and operable on the processor, wherein the processor executes the computer program to implement the steps of the method for controlling temperature of the thermal management system of the fuel cell described in Embodiment 1.

Embodiment 3

A computer-readable storage medium is provided, on which a computer program is stored, wherein the computer program, when executed by a processor, implements the steps of the method for controlling temperature of the thermal management system of the fuel cell described in Embodiment 1.

Embodiment 4

A computer program product is provided, including a computer program, wherein the computer program, when executed by a processor, implements the steps of the method for controlling temperature of the thermal management system of the fuel cell described in Embodiment 1. The technical features of the above embodiments can be combined at will. In order to make the description concise, not all possible combinations of the technical features in the above embodiments are described. However, as long as there is no contradiction between the combinations of these technical features, the combinations should be considered as the scope described in this specification.

In the present disclosure, specific examples are used to explain the principle and the implementation of the present disclosure. The description of the above embodiments is only used to help understand the method and the core idea of the present disclosure. At the same time, for those skilled in the art, according to the idea of the present disclosure, there will be changes in the specific implementation and the application scope. To sum up, the contents of this specification should not be construed as limiting the present disclosure.

What is claimed is:

1. A method for controlling temperature of a thermal management system of a fuel cell, comprising:
   acquiring actual temperature of the fuel cell at a current control time, an actual opening degree of a thermostat in the thermal management system of the fuel cell and an inlet coolant temperature at an inlet of a cell stack of the fuel cell;
   predicting temperature of the fuel cell at the current control time, with the actual opening degree and the inlet coolant temperature as an input, by using a temperature prediction model;
   correcting the predicted temperature based on a current operating condition to obtain a corrected temperature of the fuel cell at the current control time;
   calculating a prediction weight factor at the current control time based on the current operating condition; and
   determining an adjustment opening degree of the thermostat at the current control time, with a target temperature, the actual temperature, the corrected temperature and the prediction weight factor of the fuel cell as an input, by using a Proportional Integral Differential (PID) controller;
   wherein the temperature prediction model comprises $$T_{out,pre} = \begin{bmatrix} \varepsilon_1 & \varepsilon_2 \end{bmatrix} \begin{bmatrix} G_{u,Ti}(z)G_{Ti,To}(z) & 0 \\ 0 & G_{Ti,To}(z) \end{bmatrix}$$

$$\begin{bmatrix} \dfrac{(u_{tv} - H_u)W_{w,out}}{W_u} \\ \dfrac{(T_{w,in} - H_{w,in})W_{w,out}}{W_{w,in}} \end{bmatrix} + H_{w,out};$$

wherein $T_{out,pre}$ is the predicted temperature in unit of ° C.; $\varepsilon_1$ is a first weight factor; $\varepsilon_2$ is a second weight factor; $G_{u,Ti}(Z)$ is a discrete transfer function with the actual opening degree as an input and the inlet coolant temperature as an output, $G_{u,Ti}(z)$ comprises temperature transfer delay time between the actual opening degree and the inlet coolant temperature, and z is Z transformation of a discrete system; $G_{Ti,To}(z)$ is a discrete transfer function with the inlet coolant temperature as an input and the actual temperature as an output, and $G_{Ti,To}(z)$ comprises temperature transfer delay time between the inlet coolant temperature and the actual temperature; $u_{tv}$ is the actual opening degree in unit of °; $H_u$ is a mean value of sample values of the actual opening degree in unit of °; $W_{w,out}$ is a standard deviation of sample values of the actual temperature in unit of ° C.; $W_u$ is a standard deviation of sample values of the actual opening degree in unit of °; $T_{w,in}$ is the inlet coolant temperature in unit of ° C.; $H_{w,in}$ is a mean value of sample values of the inlet coolant temperature in unit of ° C.; $W_{w,in}$ is a standard deviation of the sample values of the inlet coolant temperature in unit of ° C.; and $H_{w,out}$ is a mean value of the sample values of the actual temperature in unit of ° C.;

wherein the correcting the predicted temperature based on a current operating condition to obtain a corrected temperature of the fuel cell at the current control time comprises acquiring load current of the fuel cell at the current control time and outlet water temperature at an outlet of a heat sink in the thermal management system of the fuel cell; and determining an off-line correction amount for off-line correction of the predicted temperature based on the load current and the outlet water temperature;

calculating a difference between the target temperature and the actual temperature of the fuel cell to obtain an actual error; calculating a difference between the actual temperature and the predicted temperature to obtain a prediction error; and determining an on-line correction amount for on-line correction of the predicted temperature based on the load current, the actual error and the prediction error; and calculating a sum of the predicted temperature, the off-line correction amount and the on-line correction amount to obtain the corrected temperature of the fuel cell at the current control time;

wherein a calculation formula of the corrected temperature is $$T_{pre,fix}=T_{out,pre}+K_{adapt}+K_I+K_{hec,temp};$$

wherein $T_{pre,fix}$ is the corrected temperature in unit of ° C.; $T_{out,pre}$ is the predicted temperature in unit of ° C.; $K_{adapt}$ is the on-line correction amount in unit of ° C.; $K_I$ is a load current correction amount in unit of ° C.; $K_{hec,temp}$ is an outlet water temperature correction amount in unit of ° C.;

wherein a calculation formula of the off-line correction amount is $$\begin{cases} K_I = k_1 I + b_1 \\ K_{hec,temp} = k_2 T_{hec,temp} + b_2 \end{cases};$$

wherein $K_I$ is the load current correction amount in unit of ° C.; $k_1$ is a first linear parameter; I is the load current in unit of A; $b_1$ is a second linear parameter; $K_{hec,temp}$ is the outlet water temperature correction amount in unit of ° C.; $k_2$ is a third linear parameter; $T_{hec,temp}$ is the outlet water temperature in unit of ° C.; $b_2$ is a fourth linear parameter; and the off-line correction amount is a sum of the load current correction amount and the outlet water temperature correction amount;

wherein the determining an on-line correction amount for on-line correction of the predicted temperature based on the load current, the actual error and the prediction error comprises determining whether a difference between the load current and a load current at a previous control time is equal to 0;

in response to a determination that the difference between the load current and the load current at the previous control time is not equal to 0, proceeding into a first state, assuming a first counting time as 0, and determining whether the first counting time is greater than a first time threshold and whether an absolute value of the actual error is less than a first error threshold to obtain a first determination result; in a case that the first determination result is NOT, deeming a state of the current control time as the first state, increasing the first counting time by 1, and assuming the on-line correction amount as a first predetermined value; in a case that the first determination result is YES, setting the first counting time to 0, proceeding into a second state, and determining whether an absolute value of the prediction error is greater than a second error threshold to obtain a second determination result; in a case that the second determination result is NOT, deeming a state of the current control time as a second state, and assuming the on-line correction amount as a second predetermined value; in a case that the second determination result is YES, proceeding into a third state, assuming second counting time as 0, and determining whether the absolute value of the prediction error is less than or equal to the second error threshold to obtain a third determination result; in a case that the third determination result is YES, setting the second counting time to 0, proceeding into the second state, and returning to the determining whether an absolute value of the prediction error is greater than a second error threshold; in a case that the third determination result is NOT, determining whether the second counting time is greater than a second time threshold to obtain a fourth determination result; in a case that the fourth determination result is NOT, deeming the state of the current control time as the third state, increasing the second counting time by 1, and assuming the on-line correction amount as a third predetermined value; in a case that the fourth determination result is YES, setting the second counting time to 0, proceeding to a fourth state, assuming third counting time as 0, and determining whether the third counting time is greater than a third time threshold to obtain a fifth determination result; in a case that the fifth determination result is YES, setting the third counting time to 0, proceeding to the second state, and returning to the determining whether an absolute value of the prediction error is greater than a second error threshold; in a case that the fifth determination result is NOT, deeming the state of the current control time as a fourth state, increasing the third counting time by 1, and assuming the on-line correction amount as a fourth predetermined value; and in response to a determination that the difference between the load current and the load current at the previous control time is equal to 0, acquiring a state of the previous control time; in a case that the state is the first state, returning to the determining whether the first counting time is greater than a first time threshold; in a case that the state is the second state, returning to the determining whether an absolute value of the prediction error is greater than a second error threshold; in a case that the state is the third state, returning to the determining whether the absolute value of the prediction error is less than or equal to the second error threshold; in a case that the state is the fourth state, returning to the determining whether the third counting time is greater than a third time threshold; wherein a calculation formula of the prediction weight factor is $$W_{fix}=W_{d,rp}+\gamma_s|e_{now}|+\gamma_c;$$

wherein $W_{fix}$ is the prediction weight factor; $W_{d,rp}$ is a dynamic response factor determined based on fluctuation of the load current; $\gamma_s$ is a positive constant; $e_{now}$ is an actual error between the target temperature and the actual temperature of the fuel cell in unit of ° C.; and $\gamma_c$ is a positive constant;

$$W_{d,rp}(k+1) = \begin{cases} W_h, & \left\{C_I(k) \in \left[\frac{\mathcal{T}_{w,0}}{T}, \theta_1\frac{\mathcal{T}_{w,0}}{T}\right]\right\} \& \{|e_{now}| < 3\} \\ \frac{W_h}{2}, & \left\{C_I(k) \in \left[\theta_1\frac{\mathcal{T}_{w,0}}{T}, \theta_2\frac{\mathcal{T}_{w,0}}{T}\right]\right\} \& \{|e_{now}| < 1\} \\ \frac{W_h}{3}, & \left\{C_I(k) \in \left[\theta_2\frac{\mathcal{T}_{w,0}}{T}, 0\right]\right\} \& \{|e_{now}| < 0.5\} \\ 0, & C_I(k) = 0 \end{cases};$$

wherein $W_{d,rp}(k+1)$ is a dynamic response factor at k+1 control time; $W_h$ is a constant; $C_I(k)$ is the counting time of current change upon current continuously changing to k control time in unit of s; $\tau_{w,0}$ is a constant; T is a time interval between two adjacent control times in unit of s; $\theta_1$ is a constant; and $\theta_2$ is a constant;

a calculation formula of the adjustment opening degree is:

$$u_{tv,pid} = [K_p \; K_i \; K_d] \begin{bmatrix} e_{now} + W_{fix}e_{pre} \\ \int (e_{now} + W_{fix}e_{pre}) \\ e_{now} + W_{fix}e_{pre} \end{bmatrix};$$

wherein $u_{tv,pid}$ is the adjustment opening degree in unit of °; $K_p$ is a proportional parameter of the PID controller; $K_i$ is an integral parameter of the PID controller; $K_d$ is a differential parameter of the PID controller; $e_{now}$ is the actual error between the target temperature and the actual temperature of the fuel cell in unit of ° C.; $W_{fix}$ is the prediction weight factor; and $e_{pre}$ is a correction error between the target temperature and the corrected temperature of the fuel cell in unit of ° C.;

wherein subsequent to determining the adjustment opening degree of the thermostat at the current control time by using the PID controller, the method further comprises controlling a fan and a pump to be matched with adjustment of the thermostat; wherein a formula of controlling the fan and the pump is $$\begin{cases} u_{fan} = f1(I) \\ u_{pum} = f2(I) \end{cases};$$

wherein $u_{fan}$ is a fan speed in unit of r/min; $f1$ is a first calibration logic based on current, which is set by experimental calibration according to actual fan parameters; I is the load current in unit of A; $u_{pum}$ is a pump speed in unit of r/min; and $f2$ is a second calibration logic based on the current, which is set by experimental calibration according to actual pump parameters.

2. The method according to claim 1, wherein prior to predicting temperature of the fuel cell at the current control time, with the actual opening degree and the inlet coolant temperature as an input, by using a temperature prediction model, the method further comprises:

acquiring an actual sample data set; wherein the actual sample data set comprises a plurality of groups of actual sample data, and the actual sample data comprises sample values of the actual opening degree, sample values of the inlet coolant temperature and sample values of the actual temperature;

performing data normalization processing on the actual sample data set to obtain a normalized data set;

with the actual opening degree and the inlet coolant temperature as an input and the actual temperature as an output, identifying a transfer function between the input and the output based on the normalized data set, to obtain the temperature prediction model.

3. The method according to claim 1, wherein when the current control time proceeds to the first state, the first predetermined value is 0, the second predetermined value is 0, the third predetermined value is 0, and the fourth predetermined value is a product of a buffer factor and the prediction error; and when the current control time does not proceed to the first state, the first predetermined value is an on-line correction amount at the previous control time, the second predetermined value is the on-line correction amount at the previous control time, the third predetermined value is the on-line correction amount at the previous control time, and the fourth predetermined value is the product of the buffer factor and the prediction error.

4. The method according to claim 1, wherein subsequent to determining the adjustment opening degree of the thermostat at the current control time by using the PID controller, the method further comprises determining a final adjustment opening degree of the thermostat;

wherein a calculation formula of the final adjustment opening degree of the thermostat is $$u_{tv}=u_{tv,pid}+k_{t,hec}T_{hec,out};$$

where $u_{tv}$ is the final adjustment opening degree of the thermostat in unit of °; $k_{t,hec}$ is a constant compensation factor; $T_{hec,out}$ is the outlet water temperature of the heat sink in unit of ° C.

5. A computer device, comprising:
a memory,
a processor, and
a computer program stored in the memory and operable on the processor,
wherein the processor executes the computer program to implement the method according to claim 1.

6. The computer device according to claim 5, wherein prior to predicting temperature of the fuel cell at the current control time, with the actual opening degree and the inlet coolant temperature as an input, by using a temperature prediction model, the method further comprises:

acquiring an actual sample data set; wherein the actual sample data set comprises a plurality of groups of actual sample data, and the actual sample data comprises sample values of the actual opening degree, sample values of the inlet coolant temperature and sample values of the actual temperature;

performing data normalization processing on the actual sample data set to obtain a normalized data set;

with the actual opening degree and the inlet coolant temperature as an input and the actual temperature as an output, identifying a transfer function between the input and the output based on the normalized data set, to obtain the temperature prediction model.

7. The computer device according to claim 5, wherein when the current control time proceeds to the first state, the first predetermined value is 0, the second predetermined value is 0, the third predetermined value is 0, and the fourth predetermined value is a product of a buffer factor and the prediction error; and when the current control time does not proceed to the first state, the first predetermined value is an on-line correction amount at the previous control time, the second predetermined value is the on-line correction amount at the previous control time, the third predetermined value is the on-line correction amount at the previous control time, and the fourth predetermined value is the product of the buffer factor and the prediction error.

8. The computer device according to claim 5, wherein subsequent to determining the adjustment opening degree of the thermostat at the current control time by using the PID controller, the method further comprises determining a final adjustment opening degree of the thermostat;

wherein a calculation formula of the final adjustment opening degree of the thermostat is $$u_{tv}=u_{tv,pid}+k_{t,hec}T_{hec,out};$$

where $u_{tv}$ is the final adjustment opening degree of the thermostat in unit of °; $k_{t,hec}$ is a constant compensation factor; $T_{hec,out}$ is the outlet water temperature of the heat sink in unit of ° C.

9. A computer-readable storage medium on which a computer program is stored, wherein the computer program, when executed by a processor, implements the method according to claim 1.

10. The computer-readable storage medium according to claim 9, wherein prior to predicting temperature of the fuel cell at the current control time, with the actual opening degree and the inlet coolant temperature as an input, by using a temperature prediction model, the method further comprises:

acquiring an actual sample data set; wherein the actual sample data set comprises a plurality of groups of actual sample data, and the actual sample data comprises sample values of the actual opening degree, sample values of the inlet coolant temperature and sample values of the actual temperature;

performing data normalization processing on the actual sample data set to obtain a normalized data set;

with the actual opening degree and the inlet coolant temperature as an input and the actual temperature as an output, identifying a transfer function between the input and the output based on the normalized data set, to obtain the temperature prediction model.

11. The computer-readable storage medium according to claim 9, wherein when the current control time proceeds to the first state, the first predetermined value is 0, the second predetermined value is 0, the third predetermined value is 0, and the fourth predetermined value is a product of a buffer factor and the prediction error; and when the current control time does not proceed to the first state, the first predetermined value is an on-line correction amount at the previous control time, the second predetermined value is the on-line correction amount at the previous control time, the third predetermined value is the on-line correction amount at the previous control time, and the fourth predetermined value is the product of the buffer factor and the prediction error.

12. The computer-readable storage medium according to claim 9, wherein subsequent to determining the adjustment opening degree of the thermostat at the current control time by using the PID controller, the method further comprises determining a final adjustment opening degree of the thermostat;

wherein a calculation formula of the final adjustment opening degree of the thermostat is $$u_{tv}=u_{tv,pid}+k_{t,hec}T_{hec,out};$$

where $u_{tv}$ is the final adjustment opening degree of the thermostat in unit of °; $K_{t,hec}$ is a constant compensation factor; $T_{hec,out}$ is the outlet water temperature of the heat sink in unit of ° C.

* * * * *